US012236093B2

(12) United States Patent
Ihara et al.

(10) Patent No.: US 12,236,093 B2
(45) Date of Patent: Feb. 25, 2025

(54) ENHANCED DATA MANAGEMENT IN DISTRIBUTED STORAGE SYSTEMS USING DYNAMIC LOAD-BASED ALLOCATION OF SEARCH AND DEDUPLICATION PROCESSES

(71) Applicant: Hitachi, Ltd., Tokyo (JP)

(72) Inventors: Hiroka Ihara, Tokyo (JP); Nobuhiro Yokoi, Tokyo (JP); Takashi Nagao, Tokyo (JP); Yoshihiro Yoshii, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 19 days.

(21) Appl. No.: 18/176,707

(22) Filed: Mar. 1, 2023

(65) Prior Publication Data

US 2023/0400982 A1 Dec. 14, 2023

(30) Foreign Application Priority Data

Jun. 13, 2022 (JP) .................................. 2022-094962

(51) Int. Cl.
 *G06F 3/06* (2006.01)
(52) U.S. Cl.
 CPC ............ *G06F 3/061* (2013.01); *G06F 3/0641* (2013.01); *G06F 3/0679* (2013.01)

(58) Field of Classification Search
 CPC ....... G06F 3/061; G06F 3/0641; G06F 3/0679
 See application file for complete search history.

(56) References Cited

U.S. PATENT DOCUMENTS 11,314,433 B1 * 4/2022 Barrell ................. G06F 9/5005
2017/0010809 A1 * 1/2017 Hironaka .............. G06F 3/0689

FOREIGN PATENT DOCUMENTS

WO 2018/061161 A1 4/2018

* cited by examiner

*Primary Examiner* — Edward J Dudek, Jr.
(74) *Attorney, Agent, or Firm* — Volpe Koenig

(57) ABSTRACT

A storage system includes: a central processing unit; a main memory; first management information that associates a hash value of received data with an address in a volume; and an I/O processing package. The I/O processing package includes an I/O processor and an I/O memory. The I/O processor executes protocol processing. The I/O processor executes at least a part of search processing of an address associated with a hash value of first received data in the first management information. The central processing unit controls execution of deduplication processing of the first received data based on data of an address associated with the hash value of the first received data.

8 Claims, 17 Drawing Sheets

FIG. 8

| FPRDT | |
|---|---|
| FPK RANGE | ALLOCATION DESTINATION ID |
| 0x0000-0x0FFF | 0 |
| 0x1000-0x1FFF | 0 |
| 0x2000-0x2FFF | 0 |
| 0x3000-0x3FFF | -1 |
| 0x4000-0x4FFF | 1 |
| 0x5000-0x5FFF | 1 |
| ... | |
| 0xEFFF-0xFFFF | 2 |

| IPU# | IPU PROCESSING PERFORMANCE | IPU LOAD FACTOR | MEMORY LOAD FACTOR | DMA LOAD FACTOR |
|---|---|---|---|---|
| 0 | 5 | 60% | 70% | 50% |
| 1 | 5 | 20% | 40% | 30% |
| 2 | 5 | 30% | 50% | 60% |
| 3 | 5 | 90% | 100% | 80% |

| FPT SEARCH PROCESSING LOAD | CPU LOAD RATIO | MEMORY LOAD RATIO | DMA LOAD RATIO |
|---|---|---|---|
| 10 | 100% | 150% | 75% |

FPRDT

| FPK RANGE | REQUEST DESTINATION ID |
|---|---|
| 0x0000-0x0FFF | 0 |
| 0x1000-0x3FFF | 1 |
| 0x4000-0x5FFF | 2 |
| NONE | 3 |
| 0x6000-0xFFFF | -1 |

15

9   12

ENHANCED DATA MANAGEMENT IN DISTRIBUTED STORAGE SYSTEMS USING DYNAMIC LOAD-BASED ALLOCATION OF SEARCH AND DEDUPLICATION PROCESSES

CLAIM OF PRIORITY

The present application claims priority from Japanese patent application JP2022-094962, filed on Jun. 13, 2022, the content of which is hereby incorporated by reference into this application.

BACKGROUND OF THE INVENTION

1. Field of the Invention

The present invention relates to a duplication data detection method (hereinafter, duplication detection method) in a storage system with a duplicated data elimination function (hereinafter, deduplication function).

2. Description of the Related Art

The storage device mainly includes a storage controller (hereinafter, controller) and a drive. The controller provides a storage service to a host connected via the SAN. The storage service refers to storing data in a drive in response to a data write request from the host and retrieving data in the drive in response to a data read request from the host.

In order to maximally utilize a finite drive capacity and reducing a drive cost, a function of detecting that the same data is written from the host to the controller a plurality of times and collectively storing the data in the drive as single data may be implemented. This is called a deduplication function.

The deduplication function may be implemented using a kind of hash function. Data written from the host is divided into chunks of a fixed length or a variable length, and data of each chunk is input to a hash function to obtain a hash value corresponding to the data. This hash value is particularly referred to as a fingerprint key (hereinafter, FPK).

In addition, the FPK corresponding to each chunk of the drive stored data, which is a target of the duplication detection, is stored in a dedicated hash table. This table is particularly referred to as a fingerprint table (hereinafter, FPT). If FPKs calculated from data written from the host are searched in the FPT and a matching FPK is found, the data pointed to by those FPKs is likely to be duplicate of each other.

The FPK-matched data is read from the drive, compared with the data written from the host, and in a case where the contents are matched, these are regarded as duplicate data, and reference to the drive-stored data is added instead of storing the data written from the host in the drive.

WO 2018-061161 A discloses a deduplication method and a storage device based thereon.

SUMMARY OF THE INVENTION

In the deduplication method disclosed in WO 2018-061161 A, since the FPT search is executed by a controller, particularly a central processing unit (CPU) in the controller, there is a problem that a processing load related to the search of the FPT increases and I/O performance deteriorates depending on a flow rate of data written from a host.

A storage system as a representative example of the present invention includes: a central processing unit; a main memory including a program area and a working area of the central processing unit; first management information that associates a hash value of received data with an address in a volume; and an I/O processing package. The I/O processing package includes an I/O processor and an I/O memory including a program area and a working area of the I/O processor. The central processing unit controls read processing and write processing of user data. The I/O processor executes protocol processing. The I/O processor executes at least a part of search processing of an address associated with a hash value of first received data in the first management information. The central processing unit controls execution of deduplication processing of the first received data based on data of an address associated with the hash value of the first received data.

According to one aspect of the present invention, the performance of the storage system can be improved.

Problems, configurations, and effects other than those described above will be clarified by the following description of embodiments.

BRIEF DESCRIPTION OF THE DRAWINGS

FIG. 8 is a configuration example of FPRDT;

FIG. 9A is a configuration example of an IPU load information table in load distribution based on FPRDT in the embodiment;

FIG. 9B is a configuration example of an FPT search load information table in load distribution based on FPRDT in the embodiment;

FIG. 9C is a configuration example of updated FPRDT in load distribution based on FPRDT in the embodiment;

DESCRIPTION OF THE PREFERRED EMBODIMENTS

Figure 1:
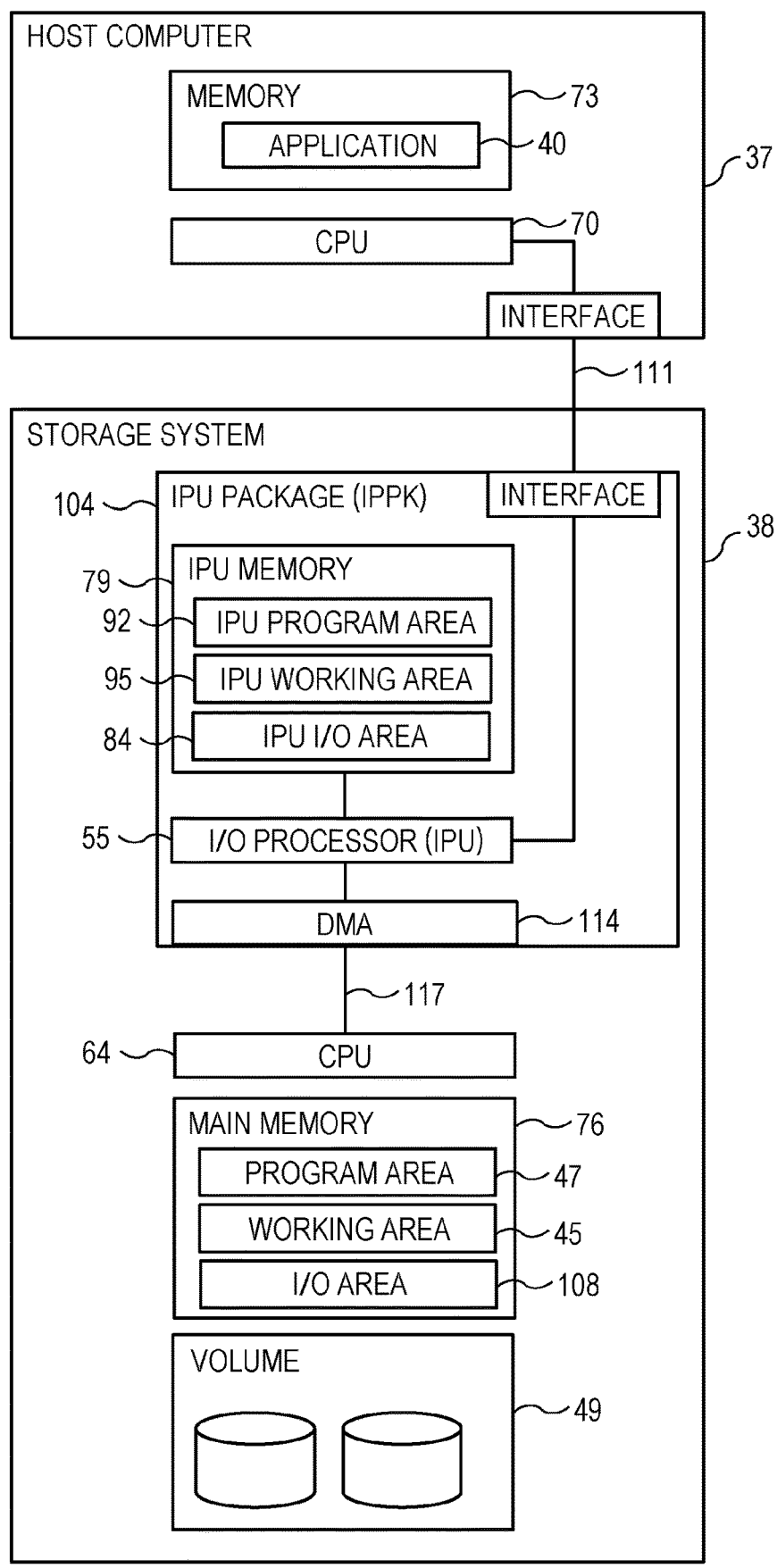
FIG. 1 is a block diagram illustrating a configuration example of an information system according to an embodiment.

Hereinafter, embodiments of the present invention will be described with reference to the drawings.

Note that the following description and drawings are examples for describing the present invention, and are omitted and simplified as appropriate for the sake of clarity of description, and the present invention can be implemented in other various forms, and each component may be singular or plural unless otherwise limited.

In addition, the embodiments described below do not limit the invention according to the claims, and all combinations of elements described in the embodiments are not necessarily essential to the method for solving the problems of the invention.

The terminology in the following description is provided below.

First, I/O with a peripheral device with a cache mechanism may be referred to as directly requesting I/O from the device. In such a case, it is assumed that the cache mechanism operates appropriately and I/O from the cache is executed appropriately. However, the present invention is not limited thereto in a case where intervening/non-intervening of the cache function is clearly indicated.

Second, processing of releasing a region on a memory or a storage device may be mentioned; however, depending on a structure of the device or implementation of control software of the device, for example in a case where the storage device is configured by a solid-state drive (SSD), actual release processing may be suspended, and the region may only be recorded as being logically released.

Third, in the description of the processing procedure, there is a case where it is defined to terminate the processing without releasing the memory area used in the processing, but the release of the used memory area is appropriately processed by a mechanism such as a garbage collection (GC).

Fourth, processing may be described with a "program" as a subject. In such a case, a processor that executes the program appropriately issues I/O to a peripheral device such as a storage according to processing contents defined in the program. When a processor that executes a program is not specified, an appropriate processor is assumed to execute the program according to the execution environment.

An FTP (fingerprint table) search for deduplication in the storage system will be described below. An increase in the CPU processing load in the controller due to the FTP search may cause I/O performance degradation. The load on the CPU can be reduced by installing search-dedicated hardware in the controller separately from the CPU and offloading high-load processing to the search-dedicated hardware. For example, a coprocessor or an FPGA for exclusively executing the FPT search is mounted, and the FPT search is offloaded to the coprocessor or the FPGA.

Mounting dedicated hardware inside the controller only for offloading the FPT search may cause problems in terms of cost, mounting area, power capacity, heat generation, and the like. An embodiment herein focuses on a surplus resource of a coprocessor mounted on a controller for a purpose different from the FPT search, and proposes offloading at least a part of the FPT search processing to the surplus resource.

Examples of the coprocessor mounted on a controller for a purpose other than FPT search include a coprocessor mounted on a controller for the purpose of offloading a processing load of a network protocol from a CPU along with support of a high-speed network standard such as 100 gigabit Ethernet (hereinafter 100 GbE) in a storage area network (SAN). Such a coprocessor is referred to as an I/O processing unit (IPU).

The IPU is equipped with a processor for network protocol processing, a memory serving as a buffer for protocol data, and a DMA engine for reading and writing the memory of the controller. It is considered that these resources are not sufficiently utilized depending on the load of the host interface to which the IPU is connected, and a surplus is generated.

As an example, in a configuration in which a plurality of IPUs supporting a high-speed network standard such as 100 GbE are mounted on the same controller, it is sufficiently possible for a single IPU to saturate the I/O band of the whole controller by a migration operation or the like, and in such a case, other IPUs become surplus resources.

By offloading the FPT search by utilizing such IPU surplus resources, it is possible to improve the performance of the storage device without mounting dedicated hardware.

However, the IPU is originally a coprocessor for handling I/O processing with the host, and it is required to avoid an influence on the I/O processing performance due to a processing load of the offloaded FPT search. In addition, since the I/O processing load with the host varies one by one depending on the operation of the host application, the amount of resources that can be used for the FPT search also varies. Therefore, instead of constantly offloading the FPT search, the controller may monitor the I/O processing load of the IPU one by one and determine whether or not offloading is possible as appropriate.

In addition, in a case where a plurality of IPUs are mounted, load distribution among the plurality of IPUs may also be a problem. It is unlikely that the I/O loads are equalized between the IPUs. For example, in a case where the load distribution is implemented by changing the offload destination by the round robin method for each FPK, the influence on the I/O performance may increase in the IPU having a high I/O load. Therefore, it is conceivable to intensively offload the FPT search to the IPU having a low I/O load among the plurality of mounted IPUs.

In the embodiments of the present specification, FPK-based load balancing is proposed to solve the problem caused by FPT search offloading. In one embodiment herein, it is not assumed that a particular hash function is used for the FPK calculation, but it is assumed that the hash function used for the same purpose has sufficient uniformity and randomness. This means that even if the input data is biased to a specific pattern, the FPK output by the hash function can be regarded as a uniform random number.

Therefore, in an implementation in which a specific FPK value range is allocated to each IPU and the search for only the FPK within the allocation range is requested to each IPU, the search load of each IPU can be adjusted by adjusting the FPK allocation range.

In the embodiment herein, the processor load, the memory load, and the DMA load of each IPU are aggregated at regular time intervals, and the FPK value allocation range to each IPU is determined based on the loads.

According to the embodiment herein, the duplication data detection processing in the storage device can be offloaded to the surplus resource of the IPU, and the performance of the storage device can be improved without mounting the dedicated hardware. Note that at least a part of the FPT search can be offloaded to an IPU that performs protocol processing for communication with a network different from the SAN or a device different from the host.

FIG. 1 is a block diagram illustrating a configuration example of an information processing system according to an embodiment herein.

An information processing system according to an embodiment herein includes a storage system 34 and a host computer 37, which are connected by a SAN 111.

The host computer 37 is a computer device including a peripheral device necessary for executing the application 40 in addition to a central processing unit (CPU) 70 and a memory 73. The host computer 37 issues a write command and a read command of data to the connected storage system 34 in response to a request from the application 40.

The storage system 34 includes a CPU 64 and a main memory 76. The main memory 76 includes a CPU program area 47, a working area 45, and an I/O area 108. The CPU 64 executes various programs arranged in the CPU program area 47. The CPU 64 provides a storage service to the host computer 37 and controls the whole storage system 34 by controlling reading and writing (read processing and write processing) of data of the volume 49 based on various programs in the CPU program area 47. The physical storage area of the volume is provided by one or more storage drives (not illustrated).

In addition, the storage system 34 includes an IPU package (IPPK) 104 on which an I/O processing unit (IPU) 55 and an IPU memory 79 are mounted. The IPU package 104 is connected to the CPU 64 via a bus 117 such as PCI Express, for example, to enable mutual communication. The IPU memory 79 includes an IPU program area 92, an IPU working area 95, and an IPU I/O area 84. The IPU 55 has a main role of relaying communication between the host computer 37 and the CPU 64 based on various programs arranged in the IPU program area 92.

A direct memory access (DMA) controller 114 (DMA 114) is mounted on the IPU 55, and the IPU 55 can read and write a space of the main memory 76 by the DMA 114.

Figure 2A:
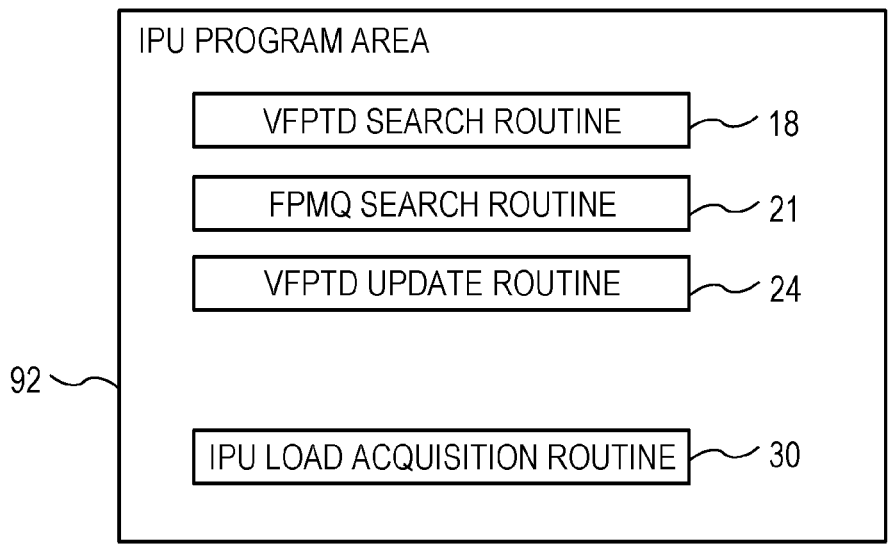
FIG. 2A is a block diagram of the inside of an IPU program area according to the embodiment.
Figure 2B:
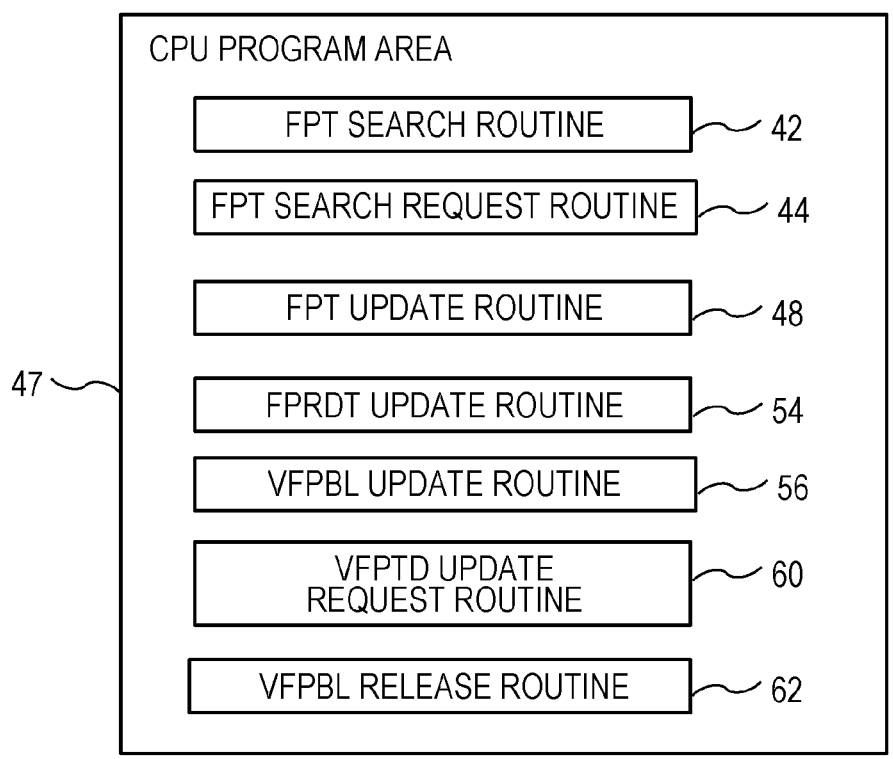
FIG. 2B is a block diagram of the inside of a CPU program area according to the embodiment.

FIG. 2A illustrates a block diagram of the inside of the IPU program area 92 according to the present embodiment. FIG. 2B illustrates a block diagram of the inside of the CPU program area 43.

The IPU program area 92 stores a finger print table directory (VFPTD) search routine 18, a VFPTD update routine 24, and an IPU load acquisition routine 30. The VFPTD search routine 18 and the VFPTD update routine 24 are regular execution routines that each stand by for a command from the CPU 64. The IPU load acquisition routine 30 is a periodic execution routine that acquires load information of the IPU at a constant cycle.

In addition, a finger print match queue (FPMQ) search routine 21 is stored in the IPU program area 92 as a subroutine of the routine. This routine is not directly called by anything other than the above-described routine.

The CPU program area 47 includes an FPT search routine 42, an FPT update routine 48, an FPRDT update routine 54, and a virtual fingerprint block list (VFPBL) release routine 62. The FPT search routine 42 is called to search for matching data at a timing when data is written from the host computer 37 and deduplication is executed.

The FPT update routine 48 is called when the deduplication processing is completed and an entry of new data is registered in the FPT, when data is deleted, or the like. The FPRDT update routine 54 is a constant execution routine based on an infinite loop. The VFPBL release routine 62 is called when the VFPBL and FPMQ need to be released due to depletion of the capacity of the CPU working area 45 or the like.

In addition, the CPU program area 47 includes an FPT search request routine 44 and a VFPTD update request routine 60 as subroutines of the above-described routines. These routines are not directly called by anything other than the above routines.

Figure 3A:
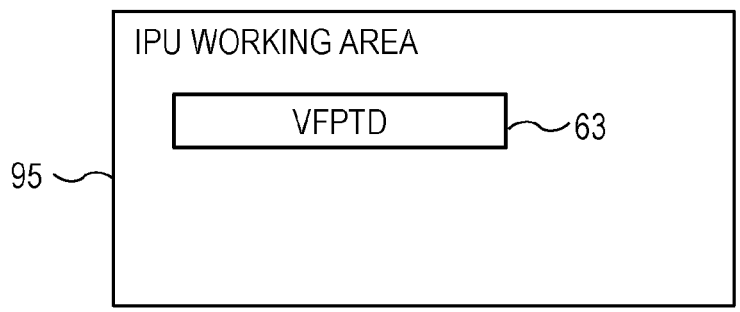
FIG. 3A is a block diagram of the inside of an IPU working area according to the embodiment.
Figure 3B:
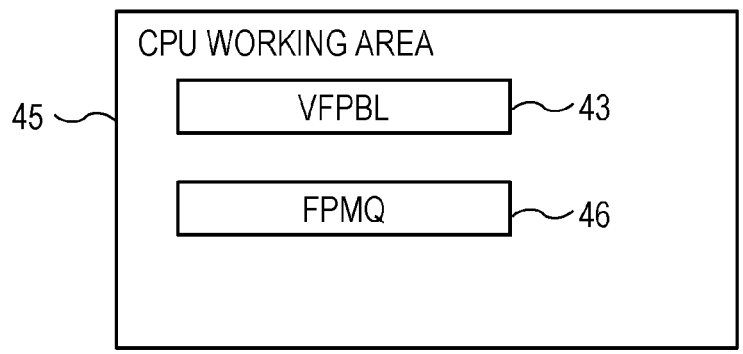
FIG. 3B is a block diagram of the inside of a CPU working area according to the embodiment.

FIG. 3A illustrates a block diagram of the inside of an IPU working area 95. The IPU working area 95 stores a VFPTD 63. FIG. 3B is a block diagram of the inside of a CPU working area 45. The CPU working area 45 stores a VFPBL 43 and a FPMQ 46. The IPU I/O area 84 does not particularly include a data structure.

Figure 4:
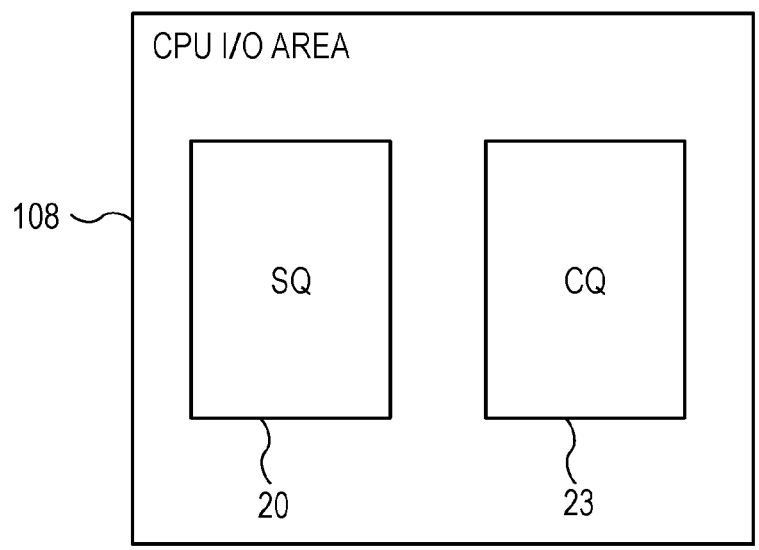
FIG. 4 is a block diagram of the inside of an I/O area of each of the CPU and the IPU according to the embodiment.

FIG. 4 illustrates a block diagram of the inside of the CPU I/O area 108. In the CPU I/O area 108, a pair of a submission queue (SQ) 20 and a completion queue (CQ) 23 for exchanging command/response with each IPU 55 are stored per IPU 55.

Figure 5:
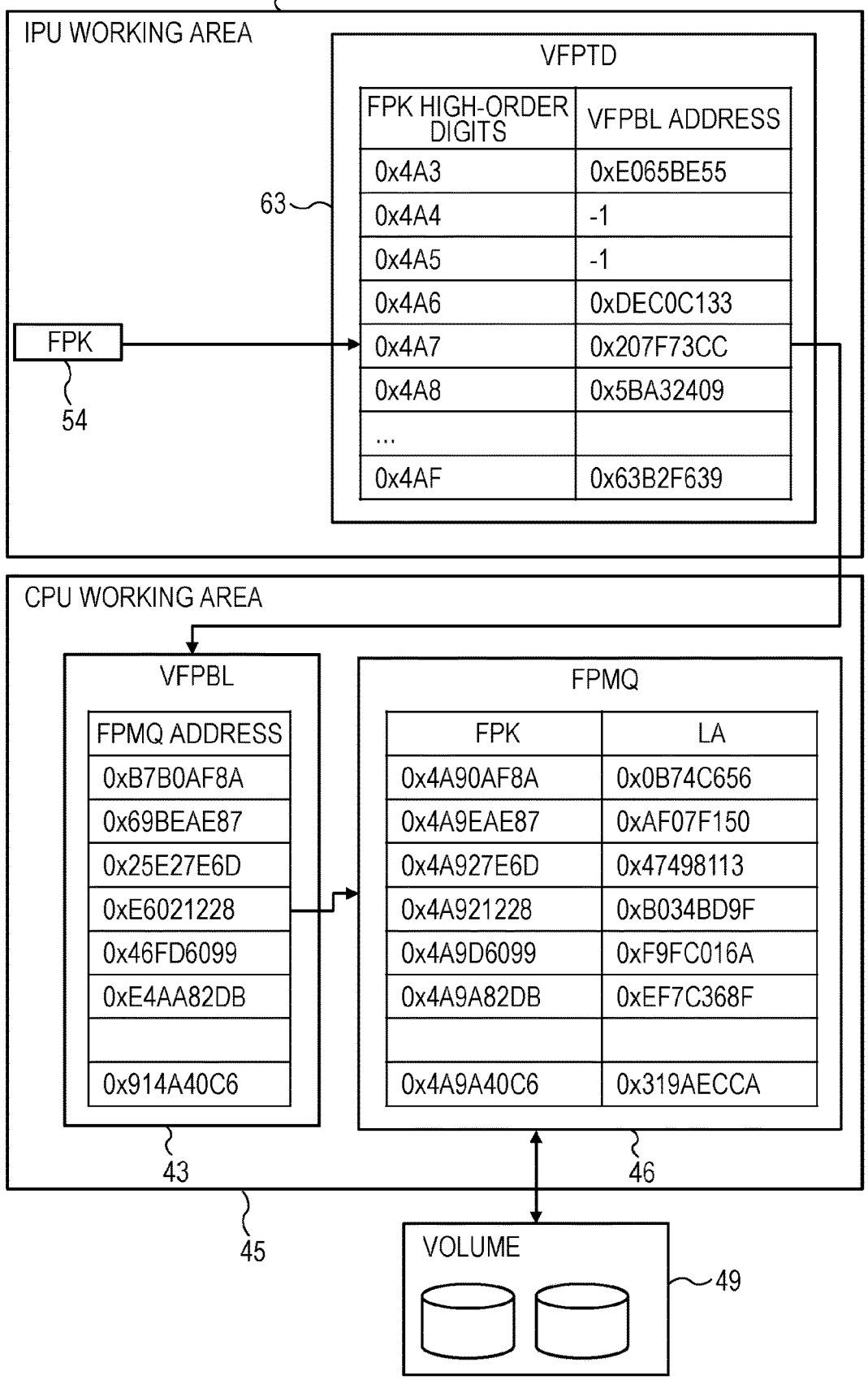
FIG. 5 is a configuration example of the whole FPT.

FIG. 5 illustrates a configuration example of the whole FPT according to the present embodiment. In the present embodiment, the FPT includes three types of tables: the VFPTD 63, the VFPBL 43, and the FPMQ 46.

The VFPTD 63 is always located in the IPU working area 95 and gives the address of the corresponding VFPBL 43 using the high-order bits of the FPK as an index. FIG. 5 illustrates an example of the VFPTD 63 that gives a 32-bit VFPBL address from the high-order 12 bits of the FPK; however, the number of bits of the FPK that are used as an index of the VFPTD 63 is not limited, and the bit width of the VFPBL address is not limited.

The capacity of the IPU memory 79 is generally smaller than the capacity of the main memory 76. The size of the VFPTD 63 may increase depending on the number of bits of the FPK used as the index, to place a burden on the IPU working area 95. Therefore, VFPTD 63 may also be implemented by a sparse data structure such as a trie instead of a linear array. A trie implementation method of VFPTD 63 is described in FIG. 6.

VFPTD 63 may take a special value as an invalid VFPBL address to indicate that VFPBL 43 corresponding to the index FPK does not exist in the CPU working area 45. FIG. 5 illustrates an example in which −1 is reserved as the invalid address, but another value may be set as the invalid address depending on the memory address system of the system.

When the valid VFPBL address is obtained as a result of the IPU 55 referring to the VFPTD 63 from the FPK based on the FPT search request from the CPU 64, the IPU 55 reads the corresponding VFPBL 43 from the CPU working area 45 to the IPU working area 95 by using the DMA 114. By reading only the required VFPBL 43, the burden on the IPU working area 95 can be reduced.

On the other hand, when the address obtained from the VFPTD 63 is an invalid VFPBL address, the IPU 55 requests the CPU 64 to secure the VFPBL 43. The CPU 64 reads the FPMQ 46 from the volume 49, creates the VFPBL 43 from the address of the read FPMQ 46, and requests the IPU 55 to update and re-search the VFPTD 63 using the address of the newly created VFPBL 43.

When the CPU working area 45 is depleted due to an increase in data cache or the like, it may be necessary to release the VFPBL 43 and the FPMQ 46 to secure an area. At that time, all the IPUs 55 are requested to delete the address to the corresponding VFPBL 43 from the VFPTD 63 of each IPU working area 95 and replace the address with the invalid address. Thereafter, the VFPBL 43 and the FPMQ 46 are released.

The VFPBL 43 is an array of FPMQ addresses arranged in the CPU working area 45. The addresses of all the FPMQs 46 corresponding to the same entry on the VFPTD 63 are stored in one VFPBL 43, and the IPU 55 can acquire the address to each FPMQ 46 on the CPU working area 45 with reference to the VFPBL 43 on the CPU working area 45 by the DMA 114.

Although FIG. 5 illustrates an example in which a 32-bit FPMQ address is stored, the bit width of the FPMQ address is not limited to 32 bits.

The FPMQ 46 is an array arranged in the CPU working area 45, and each entry of the FPMQ 46 includes a set of FPK and LA. The IPU 55 reads the FPMQ 46 from the CPU working area 45 to the IPU working area 95 based on the FPMQ address obtained with reference to the VFPBL 43, and searches for the FPMQ entry including the FPK matching the search target FPK. When the FPK match is detected, the IPU 55 notifies the CPU 64 of the LA stored in the entry in which the match is detected. Note that the match may be detected for a plurality of entries in one search, and in this case, the CPU 64 is notified of LA of all the entries for which the match is detected.

As described above, the FPMQ 46 may be released from the main memory 76 when the capacity of the CPU working area 45 is exhausted. Thereafter, in a case where the access to the FPMQ 46 is requested again, the CPU 64 re-ensures the access in the main memory 76 by the read access from the volume 49.

Although FIG. 5 illustrates an example in which 32-bit values are used as the FPK and the LA, the bit width of these values is not limited to 32 bits.

Figure 6:
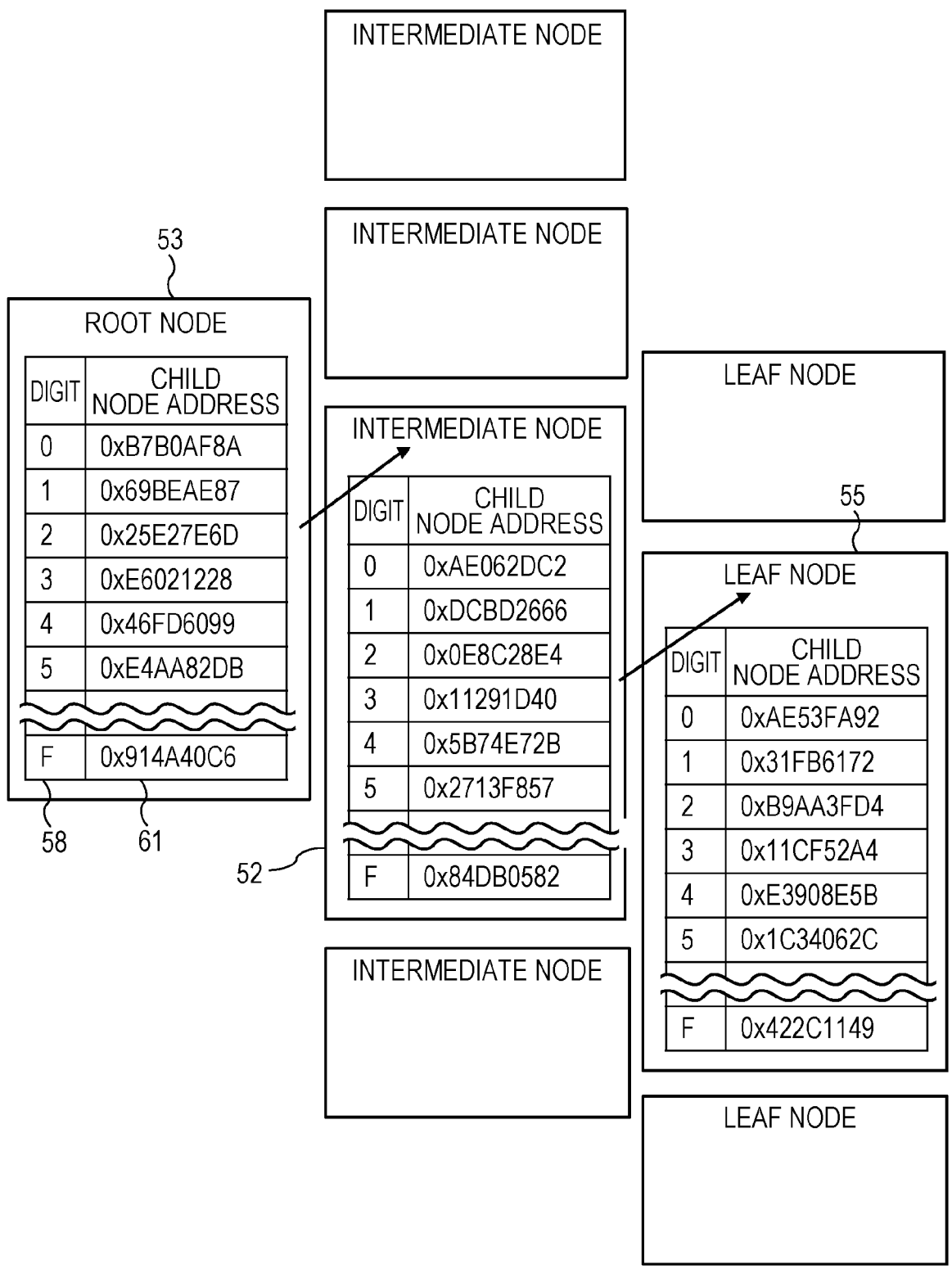
FIG. 6 is a configuration example of a trie of VFPTD.

FIG. 6 illustrates a configuration example using a trie of the VFPTD 63 according to the present embodiment.

As described above, when the VFPTD 63 is configured as a linear array or the like, the capacity of the IPU working area 95 may become tight. As such, the VFPTD 63 may be configured as a trie composed of at least one root node 53, any number of intermediate nodes 52, and any number of leaf nodes 55. At this time, each node of the VFPTD 63 has a child node address corresponding to each value of the corresponding digit, as a table 61.

The table 61 of the leaf nodes 55 points to the VFPBL 43 instead of nodes in the VFPTD 63.

For example, in FIG. 6, when the high-order 12 bits of the FPK (the first 3 digits in the hex trie) are 245, the intermediate node 52 is first read with reference to the child node address corresponding to the value 2 of the most significant digit in the root node 53. Next, the leaf node 55 is read with reference to the child node address 0x5B74E72B corresponding to the value 4 of the second digit in the table 61 of the read intermediate node 52. Finally, the VFPBL 43 corresponding to 245 is read with reference to the VFPBL 43 address 0x1C34062C corresponding to the value 5 of the third digit. Note that the addresses stored in the leaf nodes 55 refer to memory locations on the CPU working area 45, instead of the IPU working area 95.

Note that, in FIG. 6, an example is illustrated in which the VFPTD 63 is configured as a hex trie with a maximum depth of 3; however, the cardinal number of the trie may not be 16, and the depth of the trie may not be 3.

Figure 7A:
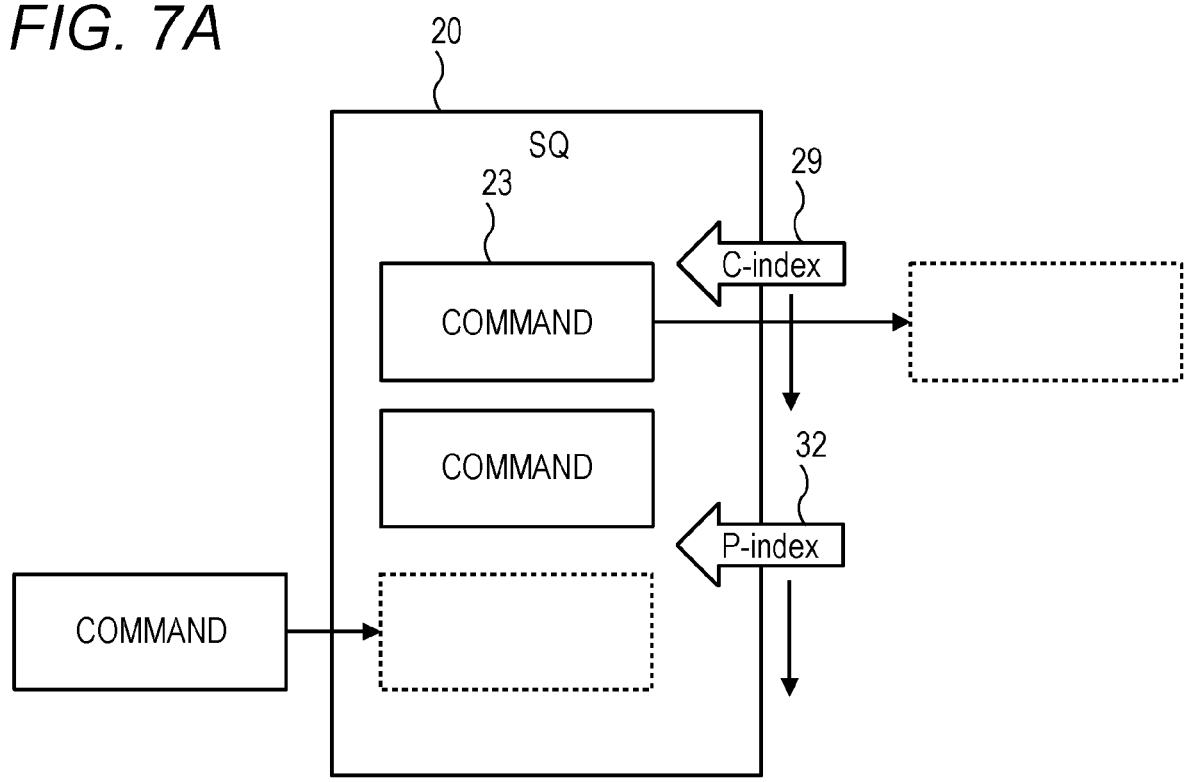
FIG. 7A is a configuration example of SQ.
Figure 7B:
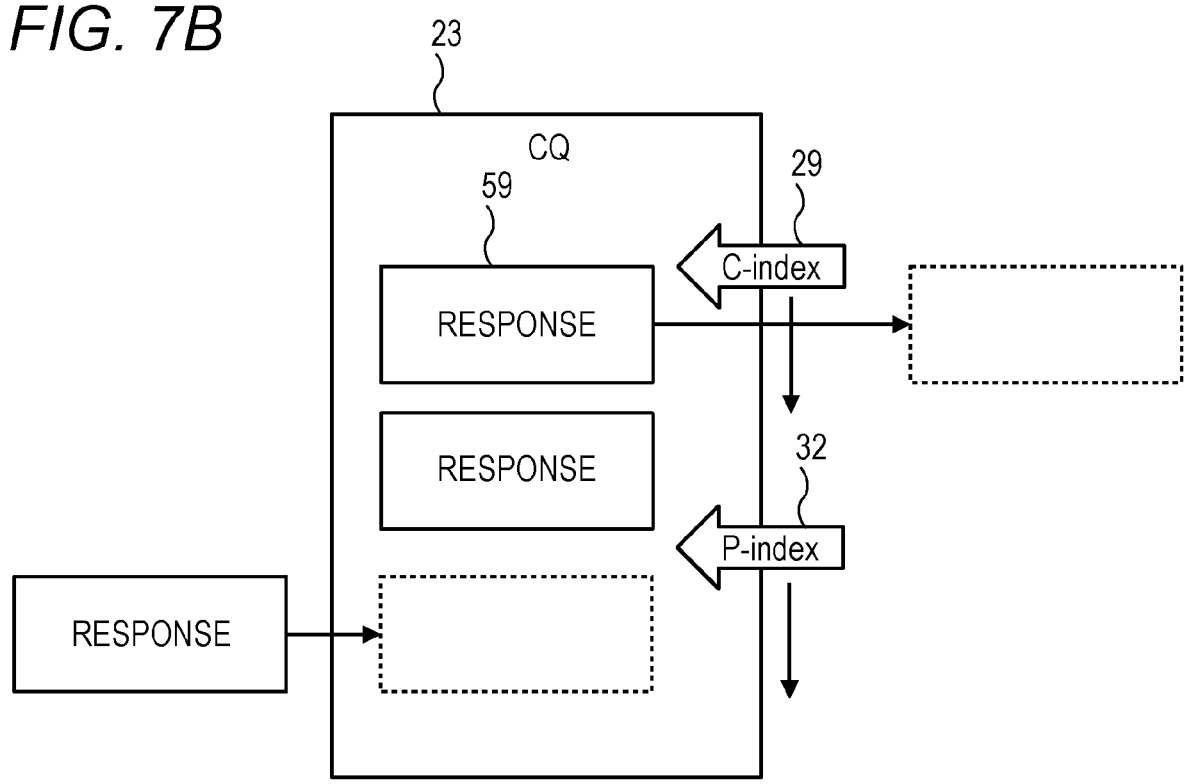
FIG. 7B is a configuration example of CQ.

FIG. 7A illustrates a configuration example of the SQ 20 according to the present embodiment. FIG. 7B illustrates a configuration example of the CQ 23 according to the present embodiment.

The SQ 20 is arranged in the CPU I/O area 108 and functions as an area for delivering the command 23 from the CPU 64 to the IPU 55.

The SQ 20 is implemented as a FIFO ring buffer, a command 23 transmitted from the CPU 64 to the IPU 55 is prepended to the SQ 20, and a P-index 32 indicating the head position of the SQ is incremented. The IPU 55 retrieves the command 23 from the tail of the SQ 20 and increments the C-index 29 indicating the tail position of the SQ, thereby notifying the CPU 64 of the reception of the command 23.

The CQ 23 is arranged in the CPU I/O area 108 and functions as an area for delivering the response 59 from the IPU 55 to the CPU 64.

Similarly to the SQ 20, the CQ 23 is implemented as a FIFO ring buffer. The response 59 transmitted from the IPU 55 to the CPU 64 is prepended to the CQ 23, and the P-index 32 indicating the head position of the CQ is incremented. The CPU 64 retrieves the response 59 from the tail of the CQ, increments the C-index 29 indicating the tail position of the CQ, and notifies the IPU 55 of the reception of the response 59.

FIG. 8 illustrates a configuration example of a fingerprint range dispatch table (FPRDT) 15 according to the present embodiment.

The FPRDT 15 is a table including two columns: an FPK range 9 and an allocation destination ID 12. A section of the FPK is registered in the FPK range 9, and an allocation destination IPU number of the FPT search for the FPK in each FPK section is registered in the allocation destination ID 12.

For example, in FIG. 8, in a case where the high-order 4 bits of the FPK are 0x2456, the FPK is in the section from 0x2000 to 0x2FFF, and thus the search request destination is the IPU of No. 0.

In addition, in the column of the allocation destination ID 12, −1 is registered as a special value, so that the search by the CPU 64 is designated without requesting the search to any IPU. Load distribution including the CPU 64 is thus enabled. The CPU 64 can execute the FPT search processing by the same method as the FPT search processing by the IPU 55 described herein.

Although FIG. 8 illustrates an example in which the 16-bit FPK is equally divided into 16 sections, the size of the FPK is not limited to 16 bits, and the number of divisions of the FPK is not limited to 16. In addition, the section division of the FPK does not need to be equal.

By determining the allocation amount of the FTP search processing by the section division of the FPK, the probability of reusability of the reference data for the search processing cached in the IPU package 104 increases, and the overall efficiency of the FTP search processing can be improved.

FIGS. 9A to 9C illustrate examples of load balancing based on the FPRDT 15 according to the present embodiment.

In the present embodiment, for example, the load information of each IPU 55 at each time is registered in the IPU load information table 31. FIG. 9A illustrates a configuration example of the IPU load information table 31. The IPU load information table 31 indicates a maximum processing capability, a current IPU load factor, a current memory load factor, and a current DMA load factor for each of the plurality of IPUs. The load factor indicates a utilization rate of performance of each component. For example, the IPU load factor may be determined based on the amount of computation per hour, the memory load factor may be determined based on the amount of access per hour, and the DMA load factor may be determined based on the amount of data transfer per hour.

The processing capability of the IPU, the processing capability of the component, and the load factor are in the following relationship. The maximum processing capability of the CPU, the memory, and the DMA matches the maximum processing capability of the IPU. In the example of FIG. 9A, the maximum processing capability of all the IPUs is 5, and the maximum processing capability of each component thereof is also 5. The processing capability exhibited (used) by each component is a product of the load factor and the maximum processing capability. The excess processing performance is a value obtained by subtracting the current use processing performance from the maximum processing performance. Note that the maximum processing capability may be different between the IPUs.

The CPU 64 acquires an IPU load factor, a memory load factor, and a DMA load factor of each IPU 55 based on information of a response transmitted by an IPU load acquisition routine 30 to be described later, and registers the IPU load factor, the memory load factor, and the DMA load factor in corresponding columns of the IPU load information table 31. The IPU load information table 31 may be stored in the CPU working area 45.

On the other hand, the CPU 64 acquires the FPT search load at each time and registers the acquired FPT search load in the FPT search load information table 28. FIG. 9B illustrates a configuration example of the FPT search load information table 28. The FPT search load information table 28 may be stored in the CPU working area 45.

The FPT search load information table 28 indicates the load of the FPT search process to be performed from these at each time and the load ratios of the CPU, the memory, and the DMA in the FPT search process. In the example of FIG. 9B, the FPT search processing load to be executed from now at the current time is 10. The IPU processing capability required for this processing is 10. Furthermore, in the FPT search process, the load ratio related to the CPU, the memory, and the DMA is 100:150:75. That is, the load of the memory is the highest and the load of the DMA is the lowest. In this example, the load ratios are common to all the IPUs; however, the load ratios may be different between the IPUs.

The CPU 64 updates the FPRDT 15 so as to maximize the use efficiency of the IPU resource at each time by collating the information in the IPU load information table 31 with the information in the FPT search load information table 28. FIG. 9C illustrates a configuration example of the updated FPRDT 15.

For example, in the examples illustrated in FIGS. 9A to 9C, the IPU of No. 0 has the maximum processing capability of 5, the IPU load factor at the present time is 60%, the memory load factor is 70%, and the DMA load factor is 50%. Therefore, the surplus processing capacity available for the FPT search is 2 (5*0.4) for the CPU, 1.5 (5*0.3) for the memory, and 2.5 (5*0.5) for the DMA.

In this example, as shown in FIG. 9B, the load of the memory is the heaviest in the FPT search. Therefore, the FPT search processing amount offloadable to the IPU of No. 0 is one out of ten in total. Note that the FPT search processing amount is offloaded by one. At this time, in the FPRDT 15, a processing amount of 1/10 or less of the entire FPT search processing is allocated to the IPU of No. 0.

Similarly, the CPU 64 determines the offload amount to the IPUs of No. 1 to No. 3. For the remaining processing, −1 or the like is set as an invalid IPU number in the FPRDT 15, and the processing is performed by the CPU 64, so that the I/O processing performance of the IPU 55 is not affected, and at the same time, the surplus resources of the IPU 55 can be effectively utilized to improve the FPT search performance.

Figure 10:
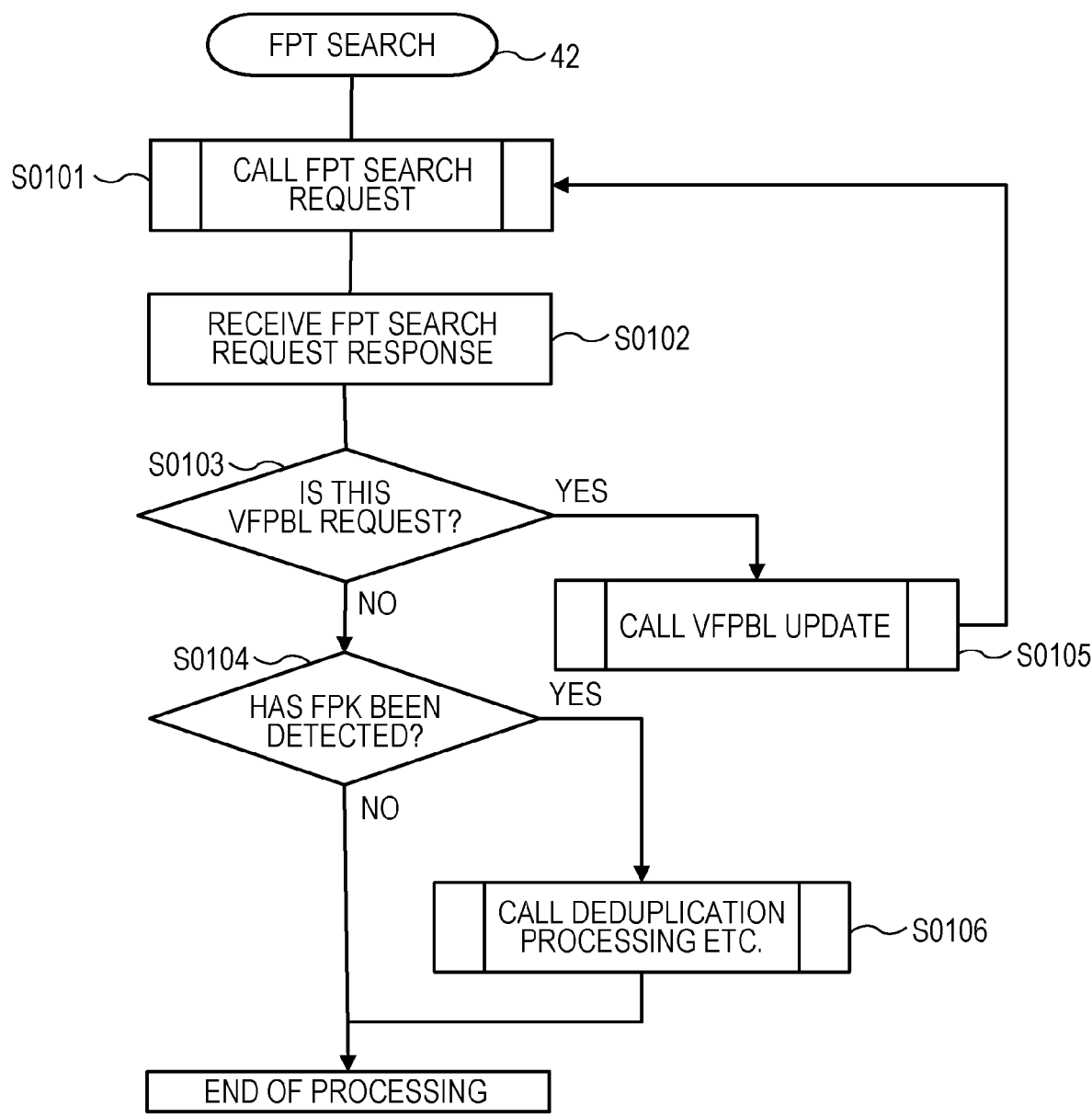
FIG. 10 is an FPT search flow according to the embodiment.

FIG. 10 illustrates an FPT search flow according to the present embodiment.

In step S0101, the FPT search routine 42 calls an FPT search request routine 44.

In step S0102, the FPT search routine 42 receives a search result of the FPT search request routine 44 from the CQ 23.

In step S0103, the FPT search routine 42 checks whether the search result of the FPT search request routine 44 received in step S0102 is a read request response of the VFPBL 43 due to an invalid address being set in the VFPTD 63.

In step S0103, when the received search result of the FPT search request routine 44 is a request response of the VFPBL, in step S0105, the FPT search routine 42 calls the VFPBL update routine 56, loads the VFPBL 43 and the whole FPMQ 46 instructed by the VFPBL from the volume 49 into the CPU working area 45, and notifies the IPU 55 of the result. Thereafter, the process returns to step S0101, and the FPT search is requested to the IPU 55.

In step S0104, the FPT search routine 42 determines whether an FPK match has been detected in the search result received from the IPU 55 in step S0102.

In a case where an FPK match is detected in step S0104, in step S0106, the FPT search routine 42 calls a deduplication processing or the like, passes at least one LA received from the IPU 55, and causes the process to be performed. An arbitrary method can be adopted as the content of the deduplication processing, and details thereof are omitted herein.

Figure 11:
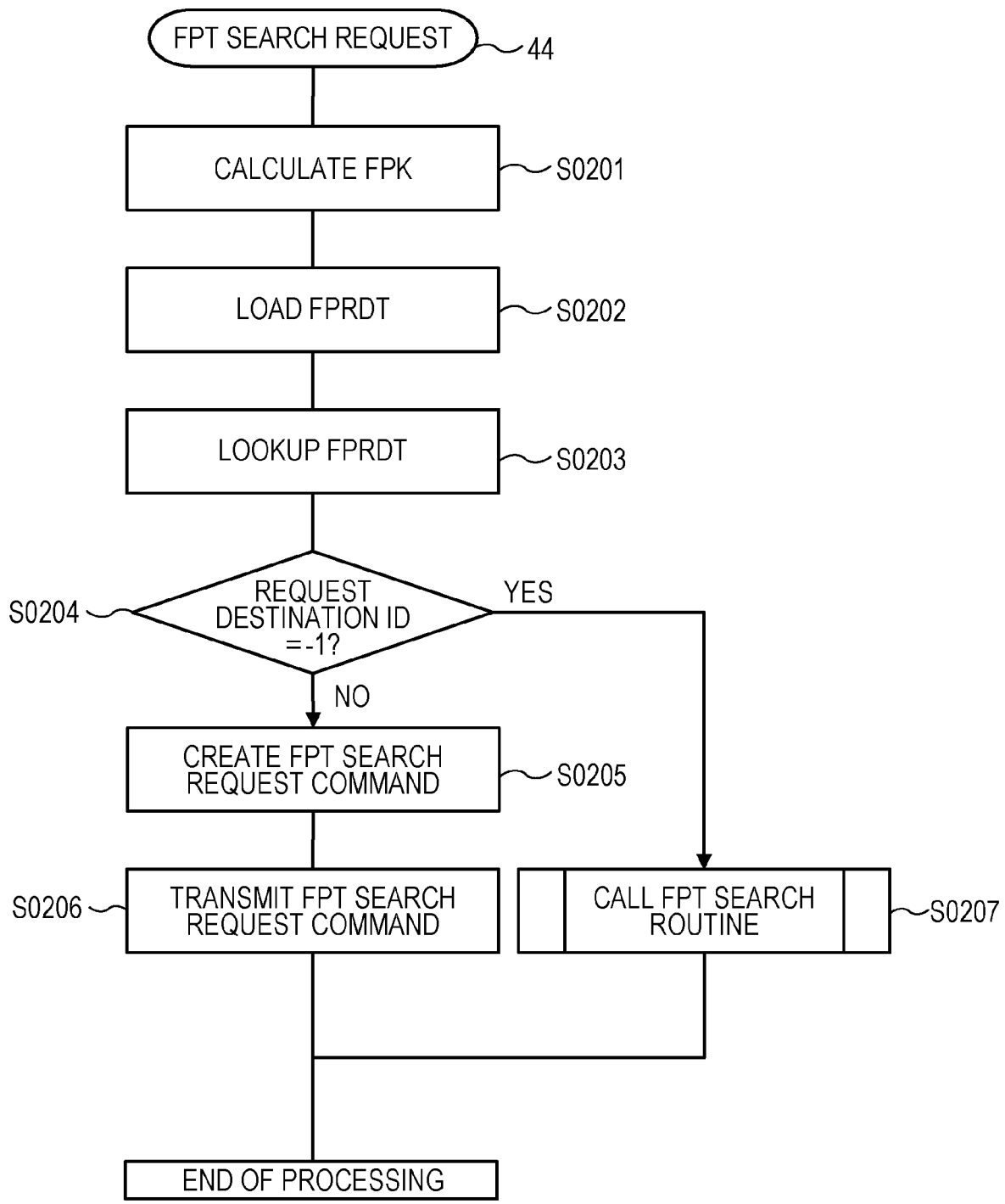
FIG. 11 is an FPT search request flow according to the embodiment.

FIG. 11 illustrates an FPT search request flow according to the present embodiment.

In step S0201, the FPT search request routine 44 calculates the FPK of the FPT search target data. The FPK is calculated by applying a hash function to the data. The type of the hash function used here is not specified in the present embodiment, and any hash function having sufficient uniformity and randomness for correctly distributing the load can be used.

When a hash function is applied to the FPK to calculate the FPK, an accelerator mounted on the CPU 64 or the IPU 55 may be used.

In step S0202, the FPT search request routine 44 reads the FPT allocation range table 15 into the memory.

In step S0203, the FPT search request routine 44 uses the value of the FPK calculated in step S0101 to look up in the FPT allocation range table 15 read in step S0202, and determines an IPU number as a search request target.

In step S0204, the FPT search request routine 44 determines an FPT search request destination based on the IPU search request destination ID read from the FPT allocation range table 15 in step S0203.

In a case where the FPT search request destination ID corresponds to any IPU in step S0204, the FPT search request routine 44 creates a command for requesting the FPT search to the IPU 55 in step S0205.

In step S0206, the FPT search request routine 44 stores the FPT search request command created in step S0205 in the SQ 20 of the request destination IPU, thereby transmitting the command. The IPU 55 that has received the FPT search request command starts the VFPTD search routine 18.

On the other hand, in a case where the FPT search request destination ID does not correspond to any IPU in step S0204, the FPT search request routine 44 calls a routine for executing the FPT search in the CPU 64 in step S0207 instead of requesting the FPT search to the IPU 55. Details of the routine will be omitted herein.

Figure 12:
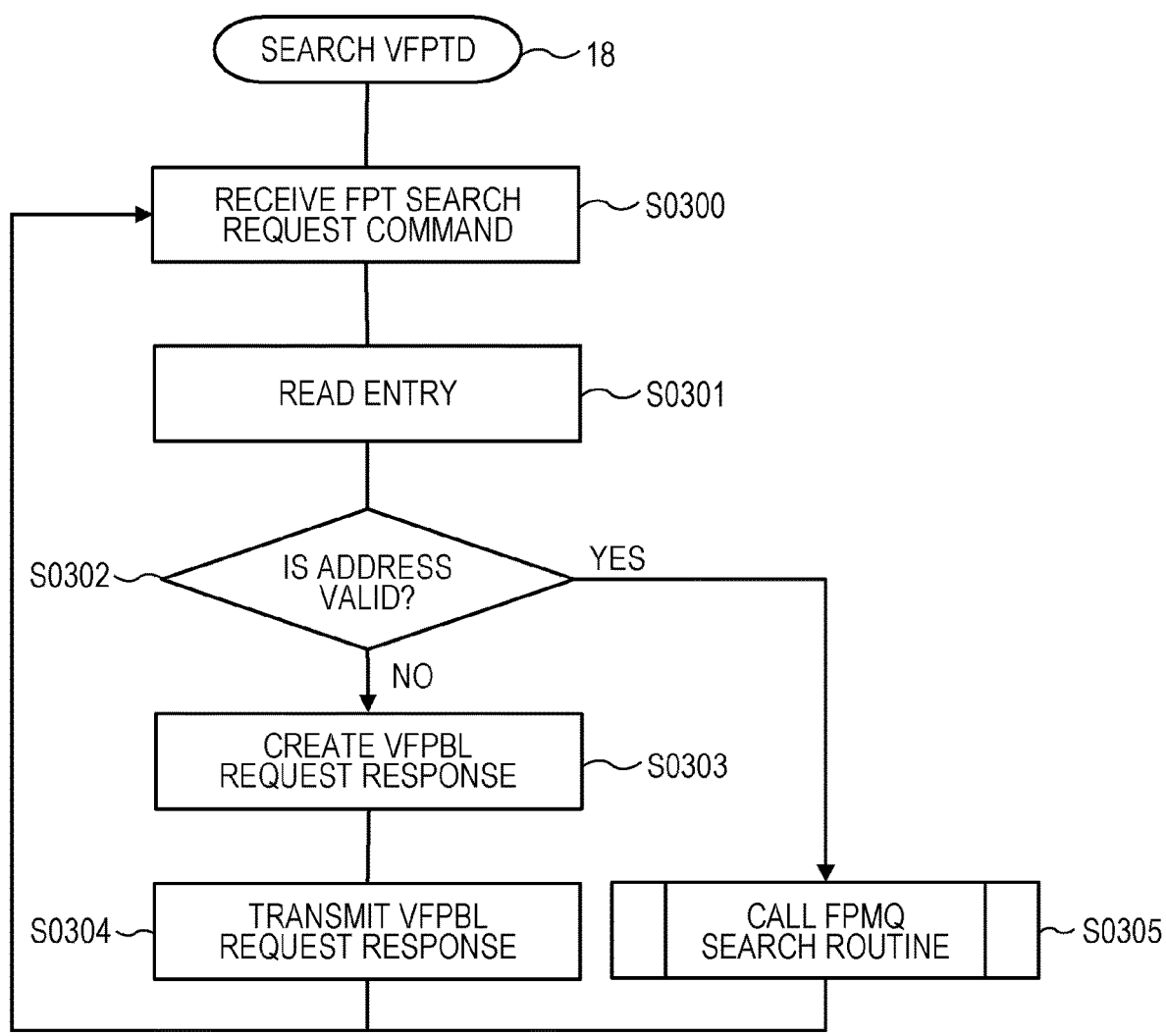
FIG. 12 is a VFPTD search flow according to the embodiment.

FIG. 12 illustrates a VFPTD search flow according to the present embodiment.

In step S0300, the VFPTD search routine 18 receives an FPT search request command from the CPU 64.

In step S0301, the VFPTD search routine 18 refers to the VFPTD 63 using the high-order bits of the FPK to obtain the VFPBL address.

In step S0302, the VFPTD search routine 18 determines whether the VFPBL address read in step S0301 is a valid address that points to a memory location in the CPU working area 45. In this example, when the VFPBL address is "−1", the address is an invalid address.

When the determination result is not the valid VFPBL address in step S0302, it is necessary for the CPU 64 to secure the VFPBL 43. Therefore, in step S0303, the VFPTD search routine 18 creates a VFPBL request response for requesting the CPU 64 to secure the VFPBL 43.

In step S0304, the VFPTD search routine 18 stores the VFPBL request response created in step S0303 in the CQ 23, and transmits the response to the CPU 64. Thereafter, the process returns to step S0300 and stands by for the next command.

When the determination result is a valid VFPBL address in step S0302, the VFPTD search routine 18 calls the FPMQ search routine 21 using the address as a parameter in step S0305. Thereafter, the process returns to step S0300 and stands by for the next command.

Figure 13:
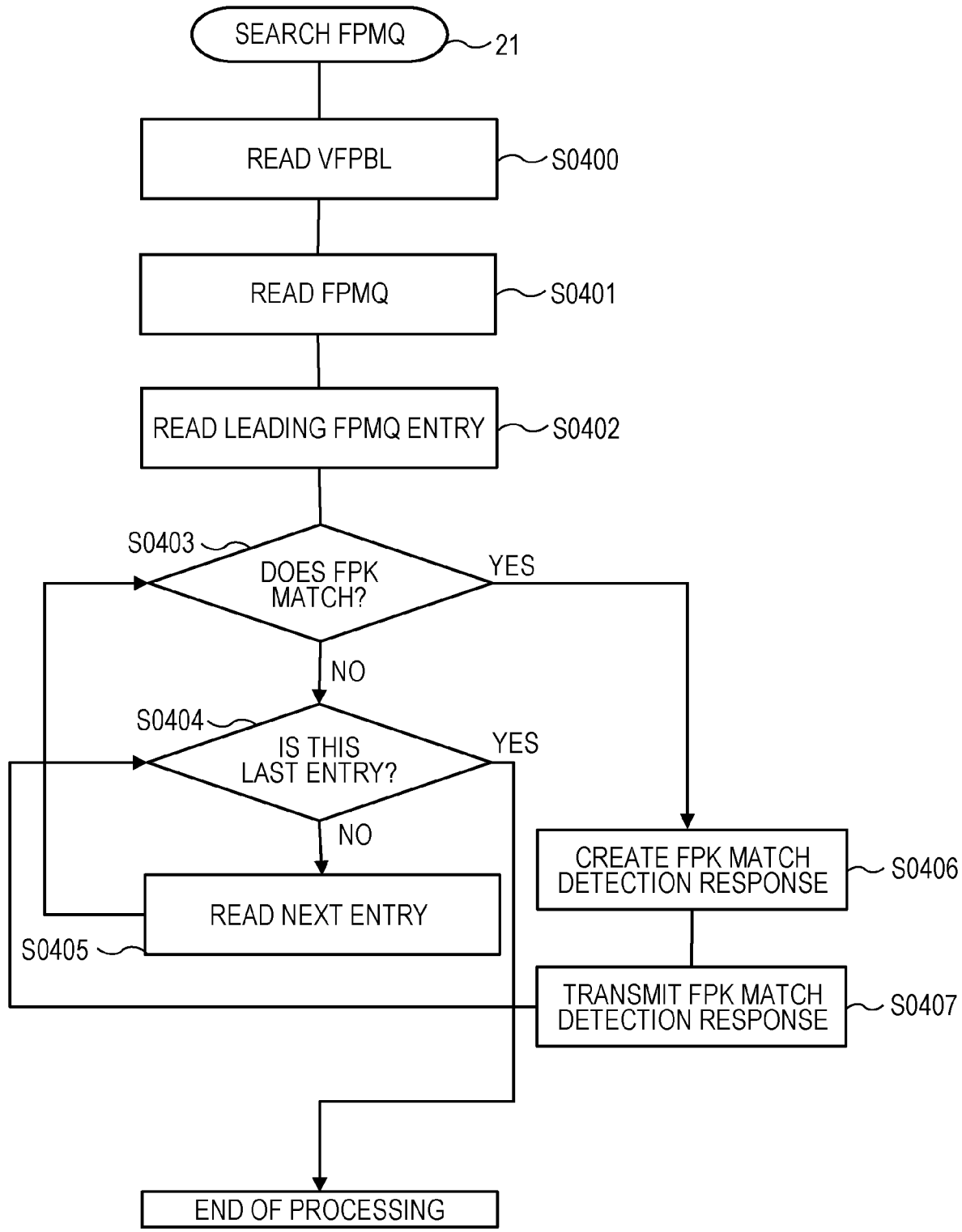
FIG. 13 is an FPMQ search flow according to the embodiment.

FIG. 13 illustrates an FPMQ search flow according to the present embodiment.

In step S0400, the FPMQ search routine 21 reads the VFPBL 43 arranged in the CPU working area 45 into the IPU working area by the DMA 114.

In step S0401, the FPMQ search routine 21 reads the FPMQ 46 arranged in the CPU working area 45 into the IPU working area by the DMA 114 based on the content of the VFPBL 43 read in step S0400. For example, the FPMQs 46 of all addresses indicated by the VFPBL 43 are read. Note that the FPMQ 46 indicated by the VFPBL 43 may be sequentially read, and the processing described below may be executed for each FPMQ 46.

When the FPMQ 46 is divided into a plurality of discontinuous regions and arranged in the CPU working area 45, all the regions are treated as one FPMQ 46. When the FPMQ 46 in the CPU working area 45 dispersed in these discontinuous areas is read into the IPU working area 95 by the DMA 114, a function of speeding up transfer of the data divided into a plurality of areas, such as a gathering function of the DMA, may be used.

In step S0402, the FPMQ search routine 21 retrieves the leading entry of the FPMQ 46 read into the IPU working area 95 in step S0401.

In step S0403, the FPMQ search routine 21 compares the FPK of the retrieved FPMQ entry with the search target FPK.

In step S0403, when the FPK of the FPMQ entry and the search target FPK do not match, in step S0404, the FPMQ search routine 21 determines whether the current FPMQ entry is the last entry in the FPMQ. In a case where it is the last entry, the processing of the routine is terminated.

If the current FPMQ entry is not the last entry in the FPMQ in step S0404, the FPMQ search routine 21 reads the next FPMQ entry in FPMQ 46 in step S0405 and returns to step S0403.

In a case where the FPK in the FPMQ entry matches the search target FPK in step S0403, the FPMQ search routine 21 creates an FPK match detection response for notifying the CPU 64 of the FPK detection in step S0406. The FPK match detection response includes the LA associated with each of the at least one matching FPK.

In step S0, the FPMQ search routine 21 stores the FPK match detection response created in step S0406 in the CQ 23 and transmits the same to the CPU 64. Thereafter, the process proceeds to step S0404. For example, the VFPTD search may be offloaded to the IPU 55, and the FPMQ search may be executed by the CPU 64. The searched VFPBL address is passed from the IPU 55 to the CPU 64.

Figure 14:
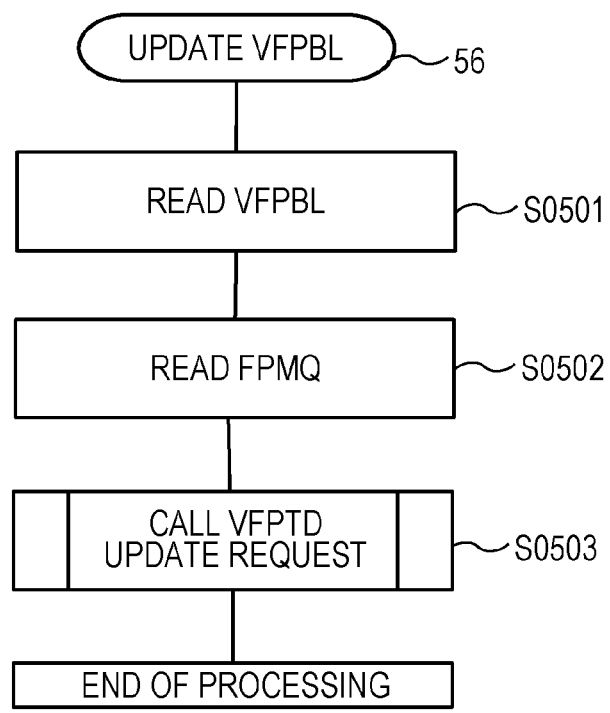
FIG. 14 is a VFPBL update flow according to the embodiment.

FIG. 14 illustrates a VFPBL update flow according to the present embodiment.

In step S0501, the VFPBL update routine 56 reads the VFPBL 43 from the volume 49 (drive) to the CPU working area 45 based on the FPK specified by the caller. When the VFPBL 43 is dispersedly stored in a plurality of discontinuous regions on the volume 49, all the regions are collectively treated as one VFPBL 43.

In step S0502, the VFPBL update routine 56 reads the FPMQ 46 into the CPU working area 45 based on the VFPBL 43 read into the CPU working area 45 in step S0501.

In step S0503, the VFPBL update routine 56 calls the VFPTD update request routine 60, and requests each IPU 55 to add the address of the VFPBL 43 read into the CPU working area 45 in step S0501 to the VFPTD 63.

Figure 15:
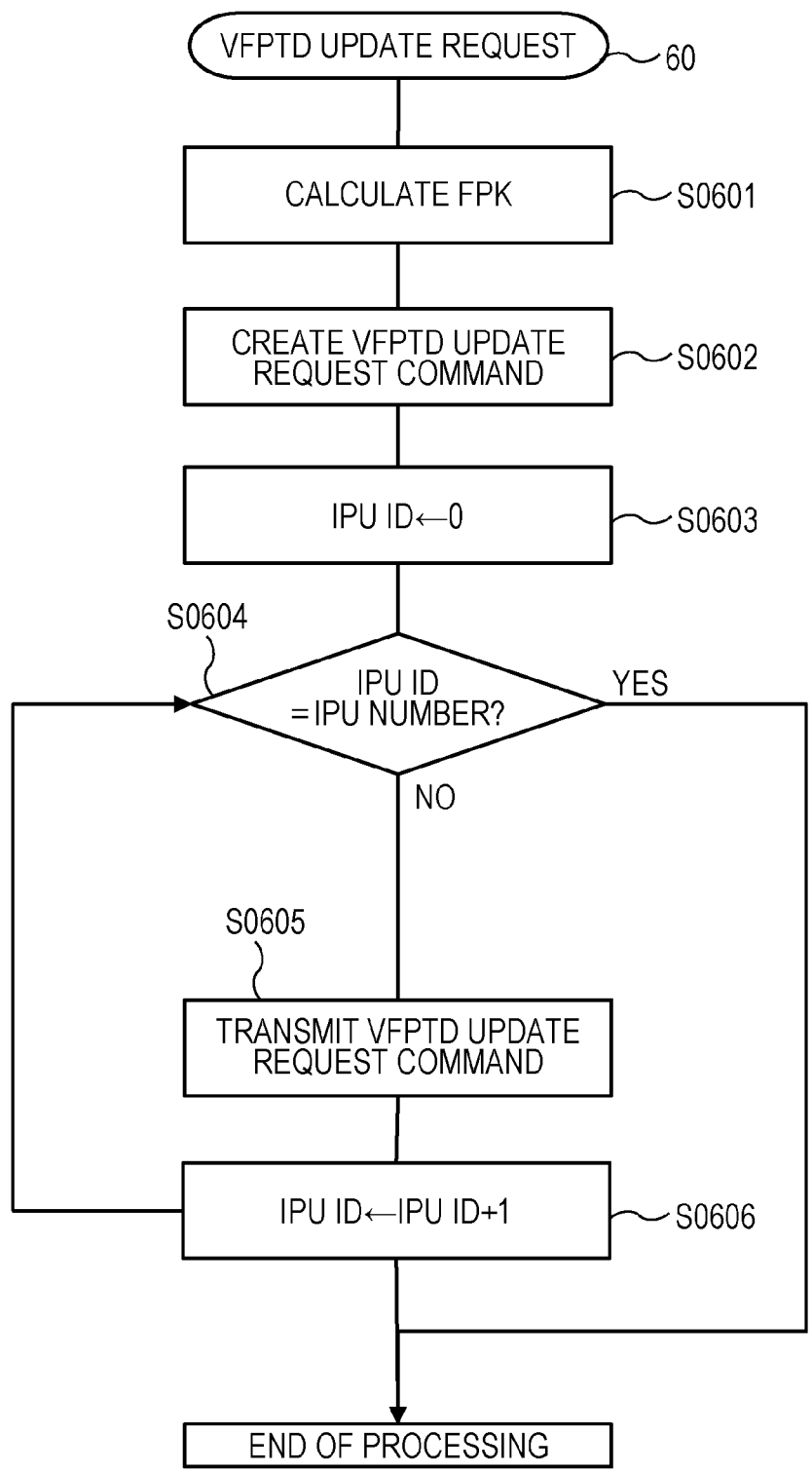
FIG. 15 is a VFPTD update request flow according to the embodiment.

FIG. 15 illustrates a VFPTD update request flow according to the present embodiment.

In step S0601, the VFPTD update request routine 60 calculates the FPK of the FPT update target data. For the FPK calculation, a method similar to that of the FPT search request routine 44 is used.

In step S0602, the VFPTD update request routine 60 creates an FPT update request command using the FPK calculated in step S0601.

In step S0603, the VFPTD update request routine 60 resets the IPU ID counter to 0.

In step S0604, the VFPTD update request routine 60 determines whether the value of the IPU ID counter exceeds the maximum value of the IPU ID.

When the value of the IPU ID counter does not exceed the maximum value of the IPU ID in step S0604, the VFPTD update request routine 60 transmits a VFPTD update request command to the IPU 55 indicated by the value of the IPU ID counter in step S0605. Upon receiving the VFPTD update request command, the IPU 55 sets the address of the target VFPBL 43 in the entry corresponding to the FPK in the VFPTD 63 in the IPU working area 95.

In step S0606, the VFPTD update request routine 60 increments the value of the IPU ID counter, and returns to step S0604.

When the value of the IPU ID counter exceeds the maximum value of the IPU ID in step S0604, the VFPTD update request routine terminates the process.

Figure 16:
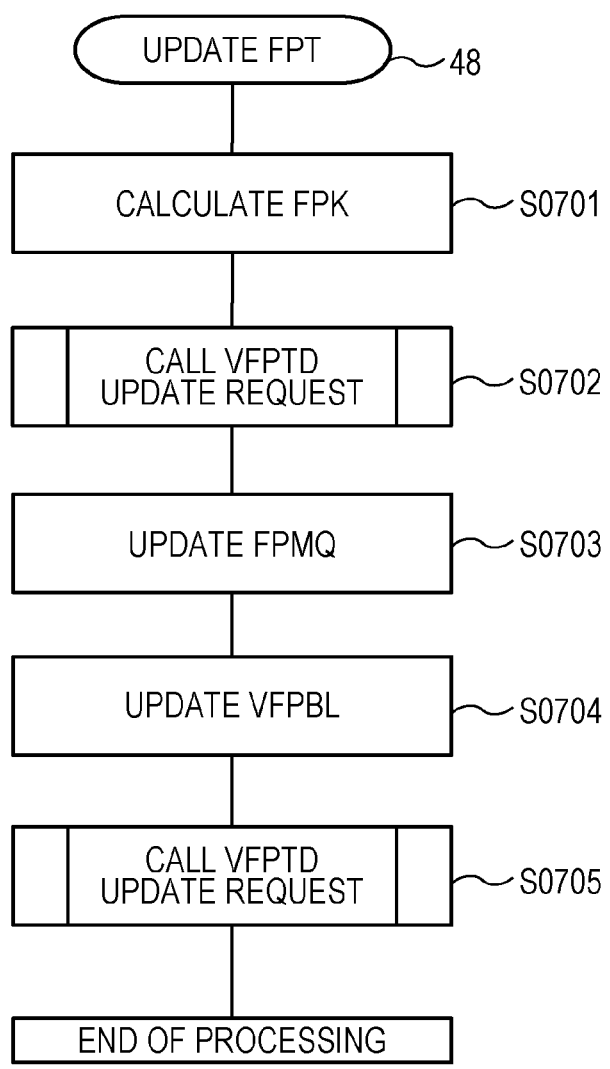
FIG. 16 is an FPT update flow according to the embodiment.

FIG. 16 illustrates an FPT update flow according to the present embodiment.

In step S0701, the FPT update routine 48 calculates the FPK of the FPT update target data. The calculation of the FPK is similar to that of the FPT search routine 42.

In step S0702, the FPT update routine 48 calls the VFPTD update request routine 60, and requests each IPU 55 to invalidate the VFPTD entry corresponding to the FPK calculated in step S0701. This is a measure to prevent the IPU 55 from referring to these data structures and reading invalid data to the IPU 55 during subsequent update operations of the FPMQ 46 and the VFPBL 43.

In step S0703, the FPT update routine 48 updates the FPMQ 46 based on the FPK calculated in step S0701. Note that the update of the FPMQ 46 refers to, for example, a table independently managed by the CPU 64, and details are omitted herein.

In step S0704, the FPT update routine 48 updates the VFPBL 43 based on the FPK calculated in step S0701.

In step S0705, the FPT update routine 48 calls the VFPTD update request routine 60 again using the updated VFPBL address, and reflects the updated VFPBL address on the VFPTD 63 held in the working area 95 by each IPU 55.

Figure 17:
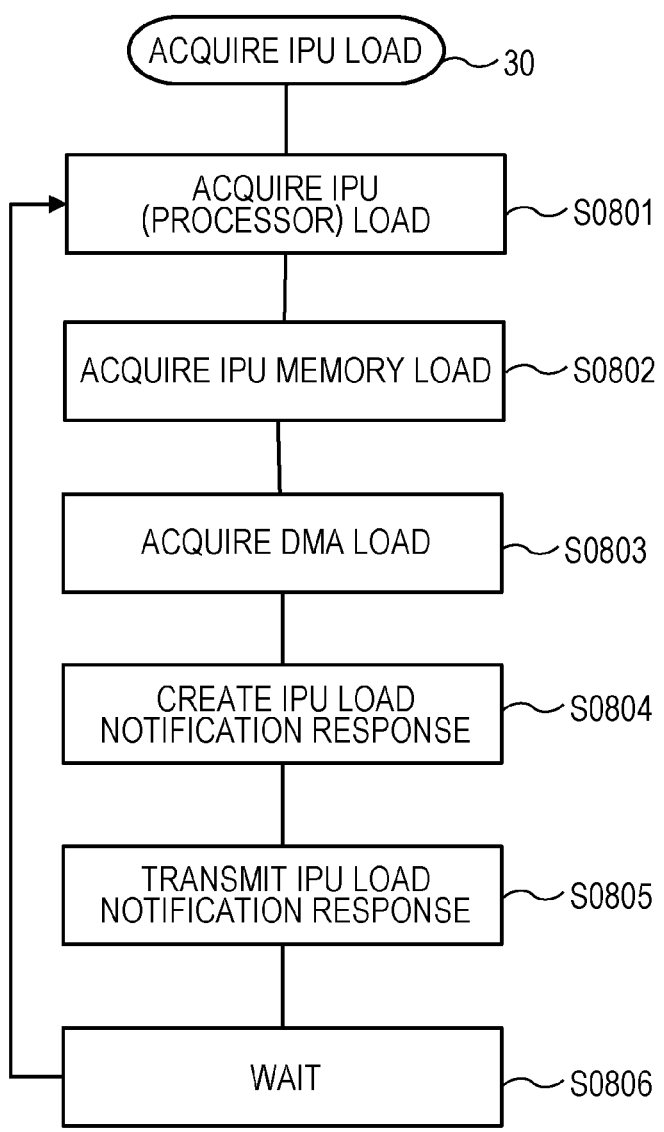
FIG. 17 is an IPU load acquisition flow according to the embodiment.

FIG. 17 illustrates an IPU load acquisition flow according to the present embodiment.

In step S0801, the IPU load acquisition routine 30 acquires the processor load of the IPU 55.

In step S0802, the IPU load acquisition routine 30 acquires the memory load of the IPU 55.

In step S0803, the IPU load acquisition routine 30 acquires the DMA load of the IPU 55.

In step S0804, the IPU load acquisition routine 30 creates an IPU load notification response for notifying the CPU 64 of the IPU load based on the load information acquired in steps S0801, S0802, and S0803.

In step S0805, the IPU load acquisition routine 30 stores the IPU load notification response created in step S0804 in the CQ 23 and transmits the response to the CPU 64.

In step S0806, the IPU load acquisition routine 30 stands by for a certain period, and returns to step S0801.

Figure 18:
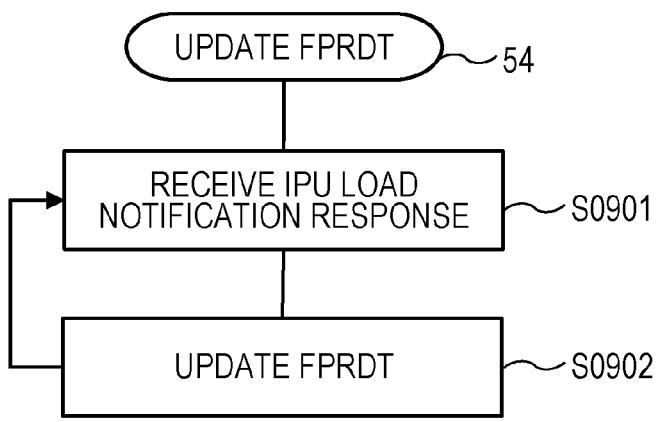
FIG. 18 is an FPRDT update flow according to the embodiment.

FIG. 18 illustrates an FPRDT update flow according to the present embodiment.

In step S0901, the FPRDT update routine 54 receives an IPU load notification response from any of the IPUs 55. This response includes information on the processor load, the memory load, and the DMA load acquired in the IPU load acquisition routine 30.

In step S0902, the FPRDT update routine 54 updates the FPRDT 15 based on the information of the response received from the IPU 55 in step S0901. The update of the FPRDT 15 is as described with reference to FIGS. 9A to 9C. Thereafter, the FPRDT update routine returns to step S0901 and waits for the next response.

Figure 19:
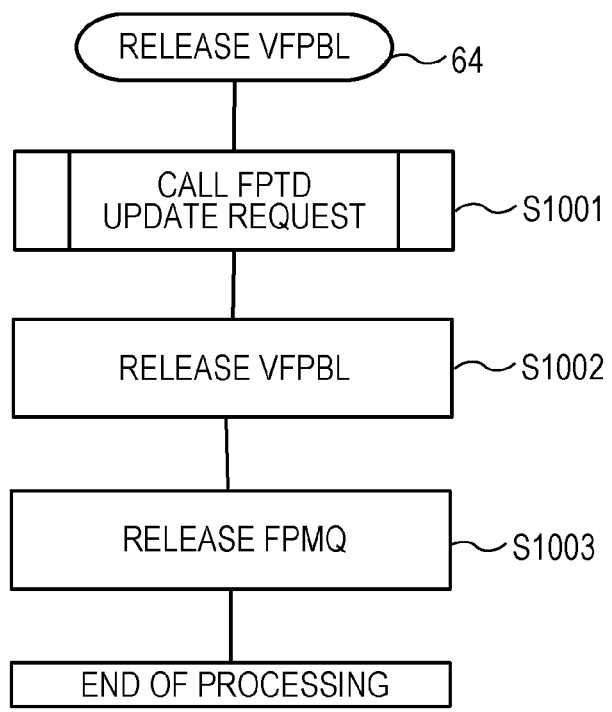
FIG. 19 is a VFPBL release flow according to the embodiment.

FIG. 19 illustrates a VFPBL release flow according to the present embodiment.

In step S1001, the VFPBL release routine 62 calls the VFPTD update request routine 60, and requests each IPU 55 to delete the reference to the VFPBL 43 corresponding to the FPK in the FPTD and replace the VFPBL with the invalid address.

In step S1002, the VFPBL release routine 62 releases VFPBL 43 from the CPU working area 45.

In step S1003, the VFPBL release routine 62 releases the FPMQ 46 from the CPU working area 45.

Figure 20:
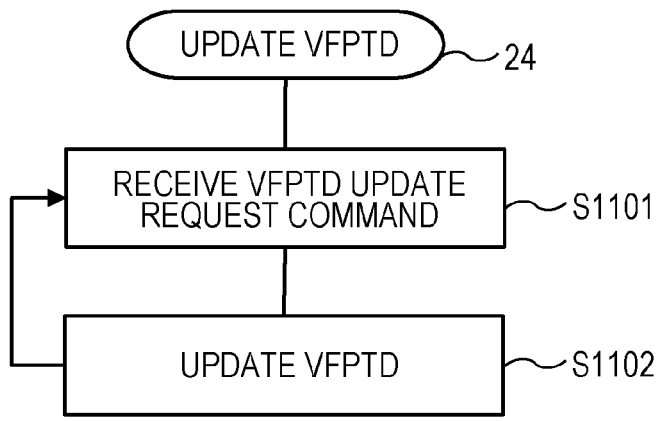
FIG. 20 is a VFPTD update flow according to the embodiment.

FIG. 20 illustrates a VFPTD update flow according to the present embodiment.

In step S1101, the VFPTD update routine 24 receives a VFPTD update request command from the CPU 64.

In step S1102, the VFPTD update routine 24 updates the VFPTD 63 arranged in the IPU working area 95 based on the FPK included in the VFPTD update request command received from the CPU 64 in step S1101 and the corresponding VFPBL address. Thereafter, the process returns to step S1101 to wait for the next VFPTD update request command.

The present invention is not limited to the above-described embodiments, and encompasses various modifications. For example, the above-described embodiments have been described in detail for the sake of comprehensible explanation of the present invention, and are not necessarily limited to those provided with all the described configurations. Furthermore, a part of the configuration of one embodiment can be replaced with the configuration of another embodiment, and the configuration of another embodiment can be added to the configuration of one embodiment. In addition, with regard to a part of the configuration of each embodiment, addition of other configurations, deletion, and replacement are possible.

In addition, some or all of the above-described configurations, functions, processing units, and the like may be embodied by hardware, for example, by designing on an integrated circuit. In addition, each of the above-described configurations, functions, and the like may be embodied by software by a processor interpreting and executing a program realizing each function. Information such as a program, a table, and a file for realizing each function can be stored in a storage device such as a memory, a hard disk, and a solid-state drive (SSD), or a recording medium such as an IC card and an SD card.

In addition, only the control lines and the information lines considered to be necessary for the description are shown, and not necessarily all the control lines and the information lines in the product are shown. In practice, it may be considered that almost all the configurations are connected to each other.

What is claimed is:

1. A storage system comprising: a central processing unit; a main memory including a program area and a working area of the central processing unit; first management information that associates a hash value of received data with an address in a volume; and a plurality of I/O processing packages, wherein each of the I/O processing package includes: an IO processor that executes protocol processing and at least apart of search processing of a respective address associated with a hash value of first received data in the first management information, and an I/O memory including a respective program area and a respective working area of the I/O processor, the IO processor, wherein the central processing unit: controls read processing and write processing of user data, controls execution of deduplication processing of the first received data based on data of the respective address associated with the hash value of the first received data, and determines an amount of the search processing of the first management information to be allocated to each of the plurality of I/O processing packages based on a load of the plurality of I/O processing packages.

2. The storage system according to claim 1, wherein I/O processor searches for an address associated with the hash value of the first received data in the first management information to locate a found address, and transmits the found address to the central processing unit.

3. The storage system according to claim 1, wherein the central processing unit further:
determines the amount of the search processing of the first management information to be allocated to each of the plurality of I/O processing packages based on a respective load of the I/O processor and the I/O memory of each of the plurality of I/O processing packages.

4. The storage system according to claim 3, wherein each of the plurality of I/O processing packages further comprises a DMA controller, and the central processing unit further determines the amount of the search processing of the first management information to be allocated to each of the plurality of I/O processing packages based on the respective load of the I/O processor, the I/O memory, and the DMA controller of each of the plurality of I/O processing packages.

5. The storage system according to claim 1, comprising:
second management information that associates a range of a respective hash value of received data with an allocation destination of at least a part of the search processing in the first management information, wherein
the central processing unit further determines the I/O processor to which at least a part of the search processing is allocated based on the hash value of the first received data and the second management information.

6. The storage system according to claim 1, comprising second management information that associates a range of a respective hash value of the received data with an allocation destination of at least a part of the search processing in the first management information, wherein
the allocation destination includes the I/O processor and the central processing unit.

7. The storage system according to claim 1, wherein
the I/O memory holds first partial information in the first management information,
the first partial information associates a respective hash value of the received data with an address in the main memory of second partial information in the first management information, and
the I/O processor further acquires a first address in the main memory from the first partial information based on the hash value of the first received data, and reads the second partial information of the first address from the main memory to the I/O memory.

8. The storage system according to claim 1, wherein
the plurality of the I/O processing packages execute the protocol processing in communication with a host.

* * * * *